Aug. 25, 1964     A. RICCA     3,145,518

CARTON CLOSING AND SEALING MACHINE

Filed March 21, 1962     6 Sheets-Sheet 1

INVENTOR.
ANTON RICCA
BY
ATTORNEY

INVENTOR.
ANTON RICCA
BY
ATTORNEY

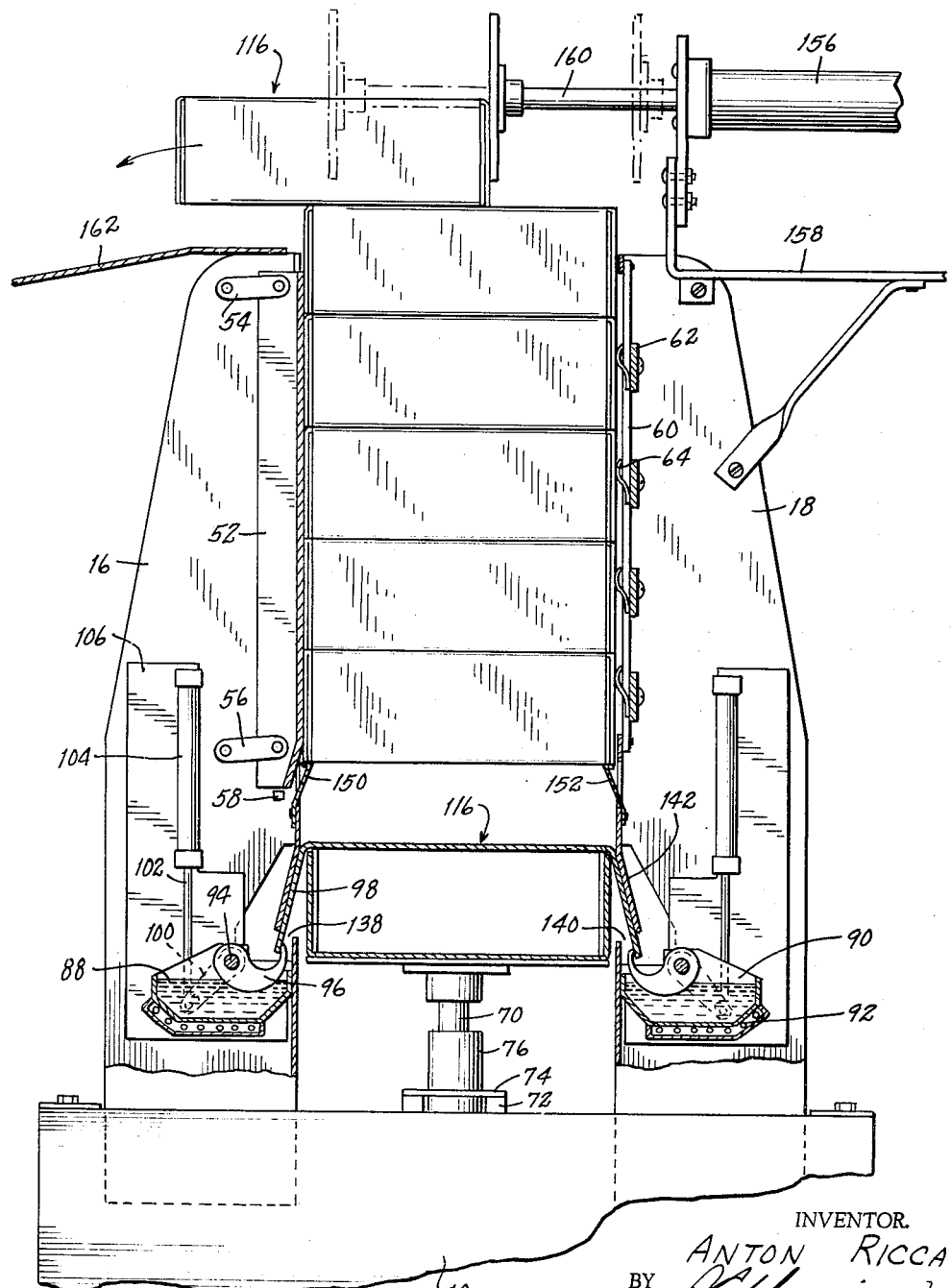

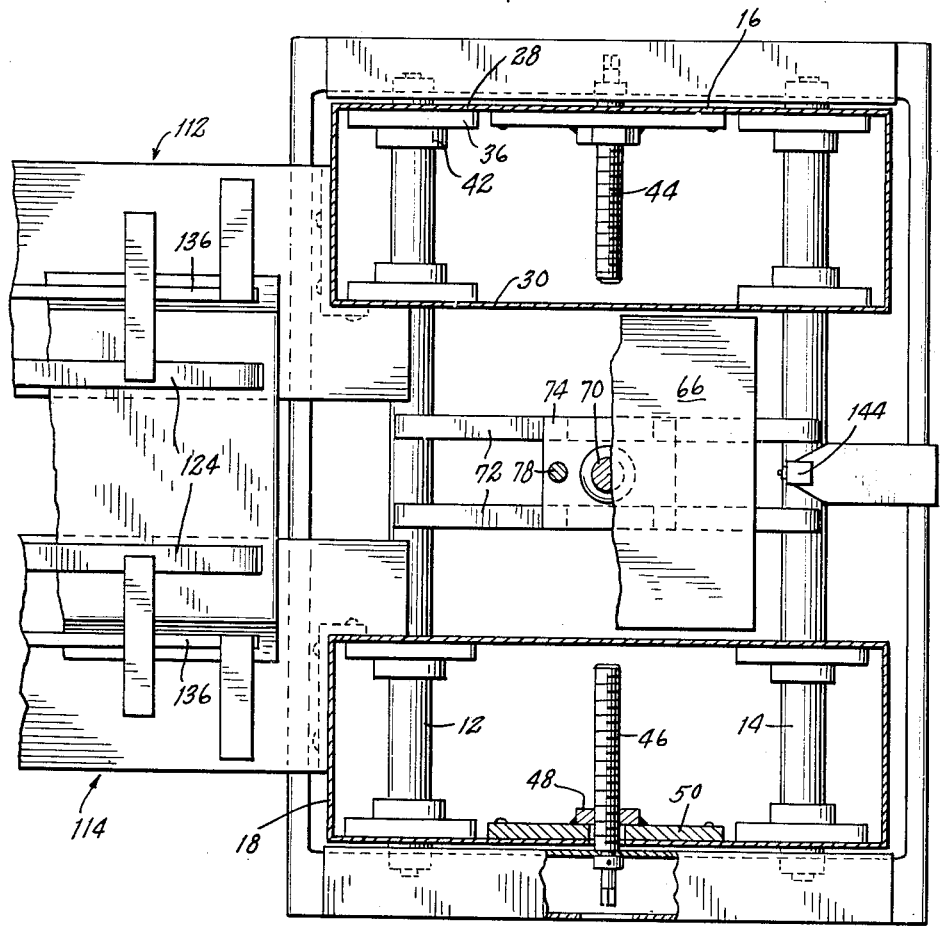
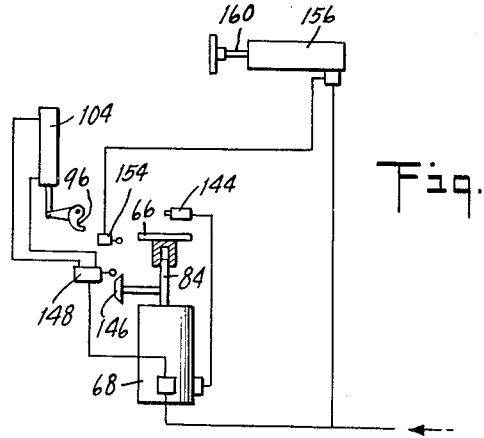

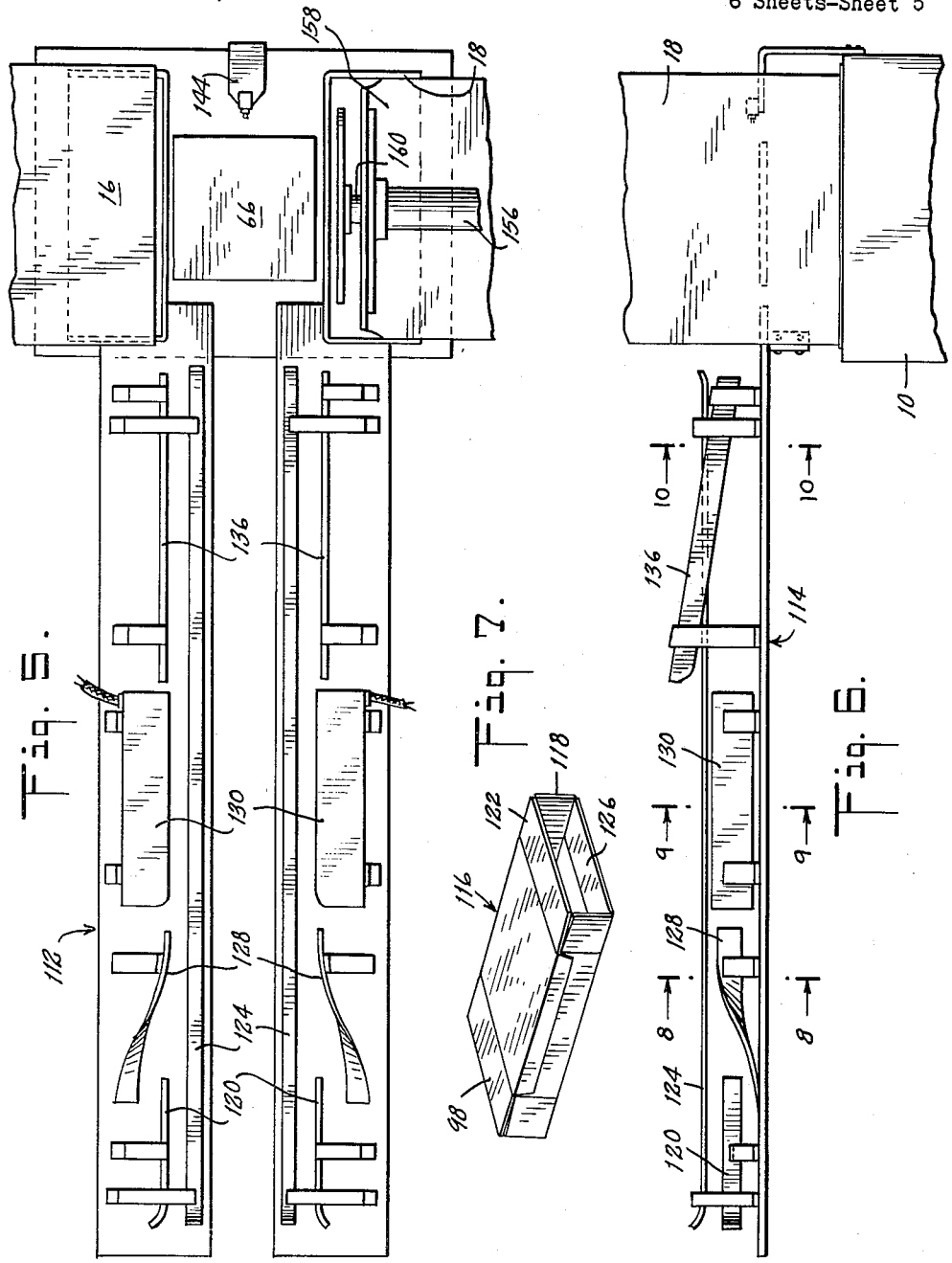

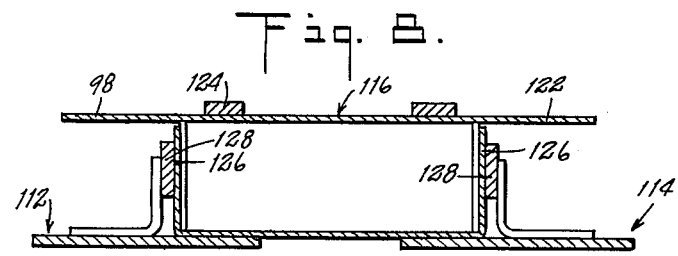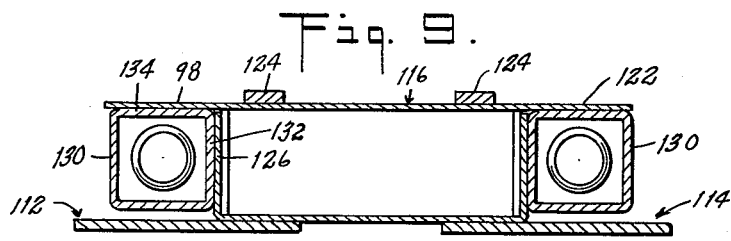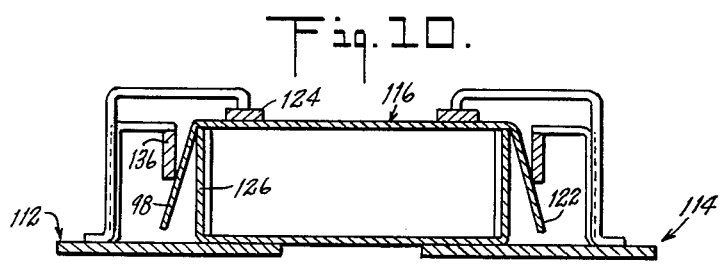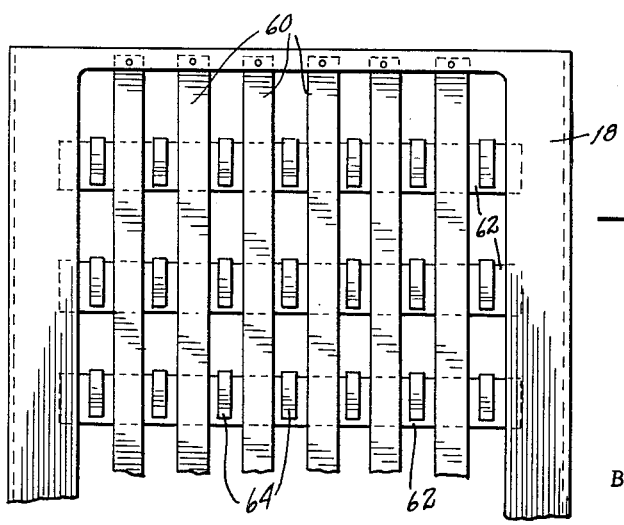

United States Patent Office 3,145,518
Patented Aug. 25, 1964

3,145,518
CARTON CLOSING AND SEALING MACHINE
Anton Ricca, East Paterson, N.J., assignor to Europak, Ltd., Ridgefield Park, N.J., a corporation of Delaware
Filed Mar. 21, 1962, Ser. No. 181,356
2 Claims. (Cl. 53—387)

This invention relates to a carton closing and sealing machine. Specifically, the invention relates to a compact, semi-automatic machine for closing and sealing the end flaps of filled cartons. The invention is an improvement on the machine shown in United States Patent No. 2,912,806, issued to P. F. Bowman on November 17, 1959.

Carton closing and sealing machines are common in the packaging industry, but known machines are so large and expensive that they are not economically available for use in many operations which today resort to the manual sealing of filled cartons.

It is, therefore, the primary object of this invention to provide a compact, inexpensive carton sealing machine which is largely automatic in its operation, and which can be used to advantage in packaging operations which involve closure and sealing of cartons of a variety of different sizes.

The objectives of the invention are served herein in a machine which has a pressure face assembly and a pressure platen assembly forming therebetween a carton throat adapted to receive and apply pressure to a series of cartons being sealed and having a carton supporting and advancing platform located in one end of said throat, all as shown in the aforesaid Bowman patent. The improvement herein consists in its main aspect in the mounting of the pressure platen assembly and the pressure face assembly in confronting parallel relation to each other and for movement toward and away from each other in combination with means for moving at least one of the assemblies toward and away from the other of said assemblies to accommodate the pressure throat to cartons of different size and shape being sealed therebetween.

It is a further object of the invention to mount both the pressure face assembly and the pressure platen assembly for movement toward and away from each other by means of screw devices which operatively engage each of the assemblies for affecting the movement thereof.

It is still another object of the invention to form the confronting faces of the pressure face assembly and the pressure platen assembly as yielding structures which there by accommodate the throat between the assemblies to the irregularities of packages being processed therein.

It is still a further object of the invention to provide a pair of adjustable glue applying devices in position to simultaneously apply glue to opposite ends of a carton to be sealed.

These and other objectives of the invention will become fully apparent as the description thereof proceeds in conjunction with the drawings in which like reference numerals indicate like parts, and in which:

FIG. 3 is a vertical sectional view;

FIG. 4 is a view taken on line 4—4 of FIG. 2;

FIG. 5 is a plan view of a carton flap folding table provided in conjunction with the inlet to the carton sealing machine;

FIG. 6 is a side elevational view of FIG. 5;

FIG. 7 is a perspective view of a carton adapted for closure and sealing in the machine;

Figure 1:
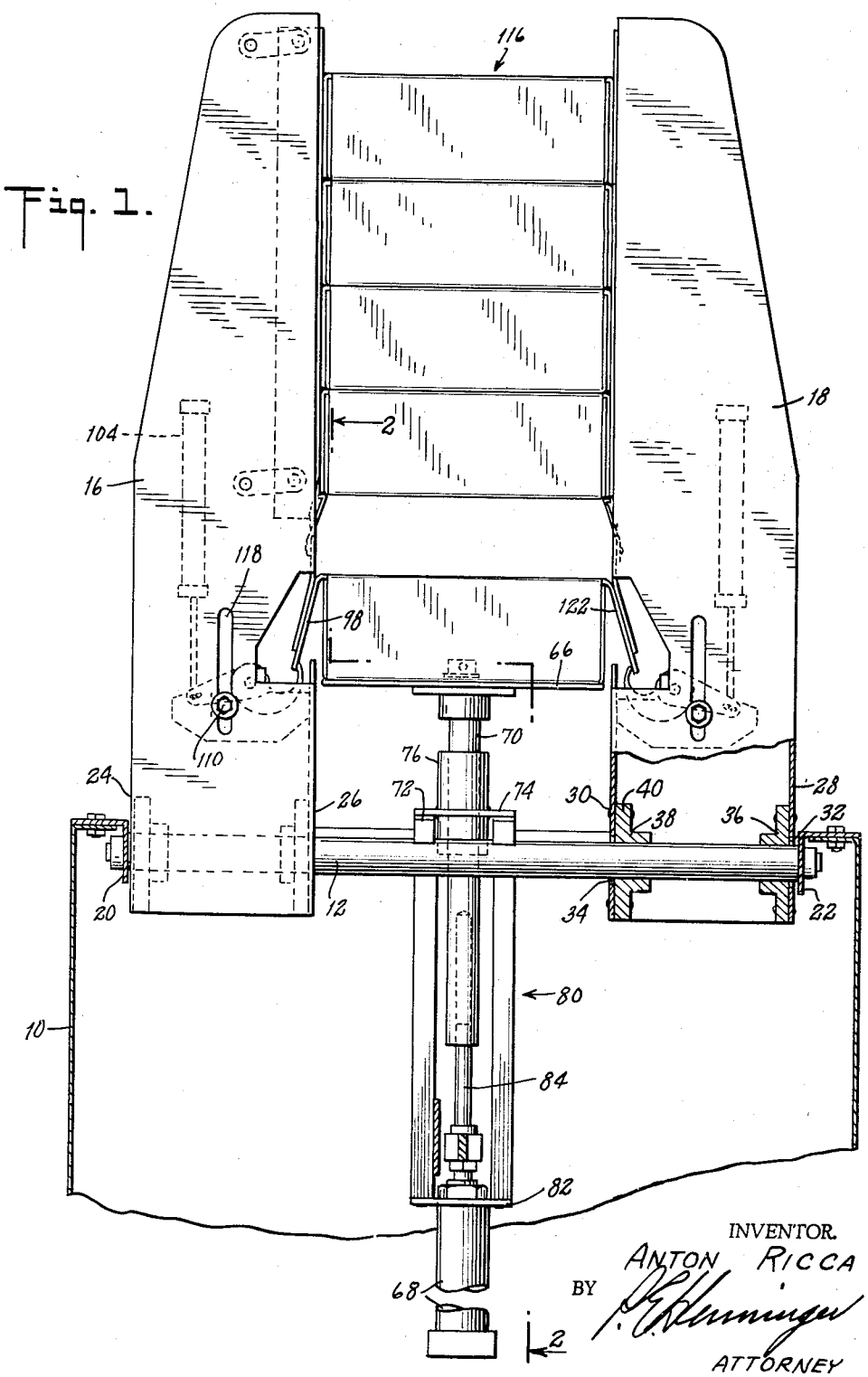
FIGURE 1 is an elevational view of a carton sealing machine which embodies the features of the invention, parts being represented in section.

FIGS. 8, 9 and 10 are respectively views on lines 8—8, 9—9 and 10—10 of FIG. 6;

FIG. 11 is a fragmentary facial view of a pressure face assembly comprising one face of a carton throat; and FIG. 12 is a diagrammatic view of a fluid pressure system associated with the machine.

The operative elements of the machine are supported on a generally rectangular cabinet base structure 10 having in the upper open face thereof a pair of parallel guide rods 12 and 14. These guide rods are adapted to mount a pressure platen assembly 16 and a pressure face assembly 18 in confronting parallel relation to each other.

The guide rods 12 and 14 have their opposite ends fixed in down turned flanges 20 and 22 of angle irons which extend along opposite upper edges of the base structure 10. The pressure platen assembly 16 and the pressure face assembly 18 comprise generally rectangular structures which at their lower ends are of tubular form. Consequently, the pressure platen assembly at its lower end presents an outer wall 24 and an inner wall 26. By the same token, the pressure face assembly 18 also presents an outer wall 28 and an inner wall 30. These confronting walls of the assemblies provide means by which the assemblies are mounted on the guide rods 12 and 14. The oppositely disposed outer and inner walls of the assembly structures have aligned apertures 32 and 34 which are reinforced respectively by bearing bushings 36 and 38. These bushings include a flange structure 40 through which they are fixed to the assembly wall and also an elongated hub structure 42 adapted to embrace the guide rods on which the assemblies are mounted.

In one highly useful form of the machine, one of the assemblies may be fixed in position such that the size of the gap between the assemblies can be controlled by moving the other assembly, slidably mounted on the guide rods, either toward or away from the opposite fixed assembly. It is, however, the preferred form of the invention that both assemblies be slidably mounted and that means be provided for moving both of the assemblies away and toward each other.

As shown in FIG. 4, a pair of lead screws are mounted in the side walls of the base structure for controlling the movement and position of the assemblies. Thus, the pressure platen assembly is controlled by a lead screw 44 while the pressure face assembly 18 is controlled by a lead screw 46. The lead screws 44 and 46 are mounted for rotation in the opposite outer walls of the base structure. They extend through a threaded element 48 mounted on the assembly wall by means of a plate 50. Thus when the outer end of either lead screw is engaged and turned, it will result in movement of the related assembly along the bearing rods 12 and 14. By providing separate lead screws for the respective assemblies, unilateral control of either or both of the assemblies is provided. In another preferred form of the invention unitary and simultaneous control to an equal degree of both assemblies can be obtained by using a single lead screw which extends across the base structure and through the threaded elements of both assemblies. In this latter case opposite ends of the lead screw would, of course, be oppositely threaded in order to move the assembly structures in opposite directions and to the same degree, depending on the direction in which the lead screw is rotated.

From the foregoing it can be readily seen that the confronting faces of the assemblies 16 and 18 may be brought closer together or may be spread further apart, thus accommodating the machine to the closure and sealing of cartons of different size.

The confronting faces of the assemblies 16 and 18 are adapted to yield to thereby accommodate the throat formed between the assemblies to irregularities in packages being processed therein.

By reference to FIG. 3, it can be seen that the pressure platen assembly 16 has supported therein a pressure platen 52 which is mounted at the top and bottom on the end walls of the assembly 16 by means of a pair of short parallel links 54 and 56. This adapts the pressure platen 52 to a limited range of movement toward and away from the confronting face of the pressure face assembly at the opposite side of the machine. Normally the bottom edge of the pressure platen 52 will rest in contact with a stop member 58 which limits its downward movement. However, as closed cartons ascend in the carton throat during a continuous closing and sealing operation, the pressure platen 52 can be carried upwardly and thus yield to the force of the cartons passing in contact therewith while at the same time maintaining a substantially uniform pressure on the closed carton flaps.

The inner face of the pressure face assembly 18, as shown in FIGS. 3 and 11, is composed of a plurality of vertical guide bars 60 and a plurality of parallel horizontal bars 62. This arrangement of the bars forms a grill-like pressure face. Mounted on the horizontal bars 62 and between the vertical bars 60 are spring fingers 64 which extend inwardly into the carton throat. These spring fingers exert a light but even pressure against one end of the cartons as they pass upwardly through the carton throat during a carton closing and sealing sequence. By this means, the carton throat is adapted to accommodate minor irregularities in the length of packages being processed.

A package receiving and advancing elevator platform 66 is mounted in the base structure for vertical reciprocation under the influence of a fluid pressure motor 68. The elevator platform is removably mounted at the upper end of a piston 70. The entire elevator mechanism including the hydraulic motor system is suspended in the base structure 10 by means of a supporting frame 72 which extends between and is fixed at opposite ends to the guide rods 14. The frame supports a guide plate 74, at its upper face, in which plate is formed an elongated hub 76 by which the piston 70 is guided. A guide rod 78 is also attached to the bottom face of the elevator platform 66 and extends through the plate 74 to add stability to movement of the elevator platform 66.

Figure 2:
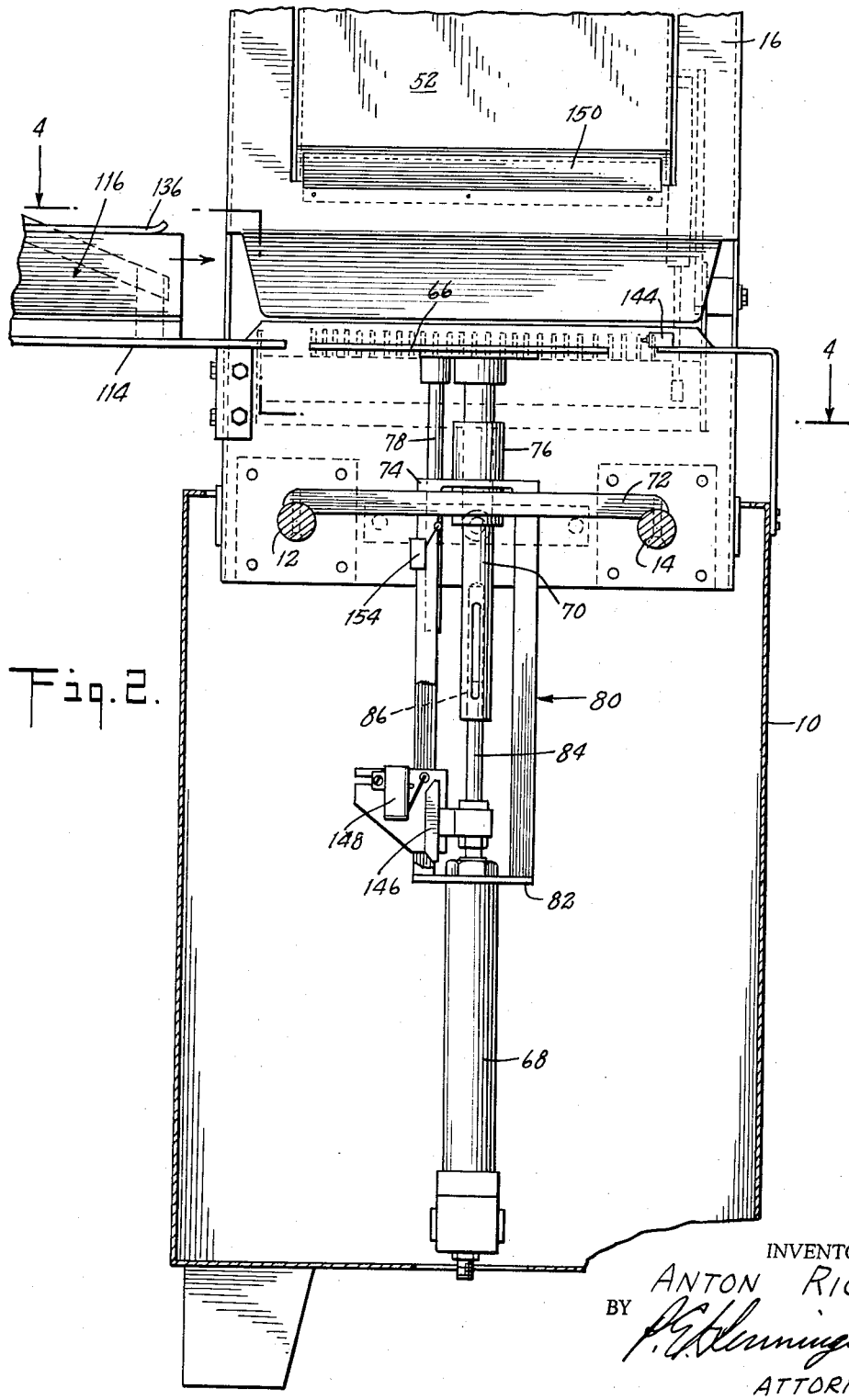
FIG. 2 is a view taken on line 2—2 of FIG. 1.

As best seen in FIG. 2, the fluid pressure motor 68 is suspended in the base structure by means of a harness mechanism 80 which is supported at its upper end from the supporting frame 72. The lower end of the harness 80 terminates in plate 82 to which the fluid pressure motor is attached.

The fluid pressure motor 68 is adapted, when operated, to reciprocate its piston rod 84 in such manner as to elevate the elevator piston 70. An axial bore 86 extends through the lower end of the elevator piston 70. The upper end of the piston rod 84 is mounted in the axial bore 86 for a predetermined amount of lost motion therein, in a manner and for a purpose to be more fully shown hereinafter.

Extending between the end walls of the pressure platen assembly 16 and the pressure face assembly 18, as best seen in FIG. 3, are glue pots 88 and 90. These pots are trough-like structures which are open at the top, but which provide a receptacle for holding a quantity of glue. When only one end of a carton is to be closed and sealed during a machine cycle, a single one of the glue pots will suffice. In the presently preferred embodiment of the machine, especially designed for the sealing of opposite ends of cartons, a pair of glue pots are provided as shown in FIG. 3. Associated with each of the glue pots is an electric heating element 92 the temperature of which is thermostatically controlled to maintain a hot adhesive at a proper temperature. Hot adhesives are usually employed with cartons made of waxed paper stock. Mounted along the length of each glue pot is a rocker shaft 94 to which is attached a series of glue-applying fingers 96. The fingers 96 are so shaped that they normally are submerged in the glue but when rotated by rocking of the shaft 94, the distal ends thereof will carry glue from the glue pot into contact with the inner face of a down turned carton closure flap as, for example, the flap 98 in FIG. 3. The rocker shaft 94 is rotated on its axis by means of a bell crank 100 which is attached to one end of the shaft, the rocking motion being imparted upon the reciprocation of a piston 102 associated with the cylinder of a fluid pressure motor 104.

The glue pots 88 and 90 and their associated operating mechanism are conveniently mounted between end plates 106 which can be adjustably attached to the opposite end walls of the carton throat assemblies. By reference to FIG. 1, it can be seen that the end walls of the assemblies are provided with slots 108 adapted to accommodate a bolt 110 extending outwardly from the supporting plates 106. Thus the glue pot assemblies can be raised and lowered to accommodate them to the application of glue to carton end flaps which are either long or short.

As best shown in FIG. 5, the pressure platen assembly 16 carries one-half 112 of a carton closing table and the pressure face assembly 18 carries the other half 114 thereof. These sections of the carton closing table are fixed respectively to the pressure platen assembly 16 and to the pressure face assembly 18 so that they move with the assemblies whenever they undergo adjustment. The halves 112 and 114 of the carton closing table are identical and perform identical operations on opposite ends of a carton. A filled carton 116 with the end flaps thereof open, as shown in FIG. 7, is introduced to the carton closing table by the operator and while being so introduced, the forward side flaps 118 of the carton will be turned inwardly by engagement with flat controlled bars 120 at the forward end of the table. In the meanwhile, the upper and outwardly extending side flaps 98 and 122 of the carton will be engaged under rails 124 which extend along the length of the table. Next, the outwardly extending bottom flaps 126 of the carton will be turned up by the members 128. This will dispose the carton flaps as shown in FIG. 8.

In some instances, it may be desirable to provide an electrically heated de-waxer 130 along the length of the carton closing table in order to remove wax from the inner surface of the top carton flaps to which the adhesive is to be applied, and from the outer surface of the bottom carton flaps to which the top flaps are to be glued. When de-waxing devices are provided, the partially closed carton will be disposed in respect to the de-waxers, as shown in FIG. 9. In this figure, it can be seen that the outer face of the inturned carton bottom flaps 126 is in contact with the heated vertically disposed de-waxer surface 132, while the inner face of the extended upper carton flaps 98 and 122 are in contact with the horizontally disposed surface 134 of the de-waxer.

As the carton proceeds along the table, the laterally extending upper flaps 98 and 122 will contact the oppositely disposed rails 136 which, as best shown in FIG. 6, are so disposed as to turn the upper flaps downwardly to the position illustrated in FIG. 10. This disposed these flaps such that they will be guided into oppositely disposed slots 138 and 140 formed in the lower end of the inner walls of the pressure assemblies 16 and 18. These slots are defined in part by wall sections 142 extending outwardly and downwardly at an angle to the general plane of the assembly surface. When so disposed, the carton flaps 98 and 122 are in position of access to the free ends of the fingers 96 constituting the glue-applying combs.

When a carton is positioned on the elevator platform 66 its forward side will contact a control switch 144 which, when operated, will admit air to the fluid pressure cylinder 68. This will cause the piston rod 84 to rise. Carried by the piston rod 84 is a cam device 146 which as it rises is adapted to operate a switch 148. The switch 148, as shown in FIG. 12, is in control of the fluid pressure cylinders 104 (only one shown in FIG. 12) which operate the glue-applying fingers 96. This operation constitutes a complete cycle wherein the glue combs are elevated to apply glue to the carton flaps and are then retracted. By the time the glue combs have been operated, the piston rod 84 will have advanced in the bore 86 of the elevator piston 70 and will have contacted the end of the bore. At the same time, continued advance of the piston rod 84 will raise the elevator piston 70 such that the elevator platform 66 and a carton thereon will be elevated to the point where the carton on the elevator platform is advanced into the carton throat between the assemblies 16 and 18. The elevator advances the carton thereon until the bottom of the carton registers with a pair of inturned spring fingers 150 and 152 by which the bottom of the advancing carton is engaged while the elevator returns to its normal position.

As the piston rod 84 reaches the upper limit of its stroke, the cam 46 will contact a switch device 154 which is in control of a fluid pressure motor 156. This latter motor, as shown in FIG. 3, is mounted on a bracket 158 supported at the top of the pressure face assembly 18. The fluid pressure motor 156 has a reciprocating piston 160 therein which is adapted to engage the uppermost sealed carton as it emerges from the upper open end of the carton throat. As the piston rod 160 is projected forwardly into engagement with such carton, the carton is displaced onto a discharge guide 162 which may deliver the carton to a suitable point by gravity. By the time the hydraulic motor 156 has operated through an entire cycle, the entire pressure system of FIG. 12 will again be in repose awaiting a succeeding operating cycle upon deposit of the next carton on the elevator platform.

While the novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. In a carton sealing machine, a base frame, a pressure face assembly and a pressure platen assembly having parallel confronting faces forming therebetween a carton throat adapted to receive and apply pressure to a series of cartons being sealed, said assemblies having base portions in generally rectangular tubular configuration including a pair of spaced generally parallel confronting base walls by which said assemblies are adapted to be mounted in an operative upright position, a first and a second pair of aligned bearing passages in said confronting base walls in each of said assemblies adapted to slide in operative relation on a respective pair of spaced parallel guide rods, a pair of spaced parallel guide rods mounted in said base frame, said guide rods extending through respective pairs of said aligned bearing passages and providing the principal support for said assemblies whereby said assemblies provide free access to said carton throat from a pair of opposite sides thereof when in operative position on said guide rods, means for effecting relative movement of said assemblies toward and away from each other to accommodate said pressure throat to the length of cartons being sealed therebetween, a carton supporting and advancing platform supported from said guide rods in one end of said throat, and means also supported from said guide rods in operative association with said carton supporting and advancing platform adapted to reciprocate said carton supporting and advancing platform whereby a carton thereon is advanced into said pressure throat and cartons in said throat in advance thereof are urged through said throat.

2. In a carton sealing machine, a base frame, a pressure face assembly and a pressure platen assembly having parallel confronting faces forming therebetween a carton throat adapted to receive and apply pressure to a series of cartons being sealed, said assemblies having base portions in generally rectangular tubular configuration including a pair of spaced generally parallel confronting base walls by which said assemblies are adapted to be mounted in an operative upright position, a first and a second pair of aligned bearing passages in said confronting base walls in each of said assemblies adapted to slide in operative relation on a respective pair of spaced parallel guide rods, a pair of spaced parallel guide rods mounted in said base frame, said guide rods extending through respective pairs of said aligned bearing passages and providing the principal support for said assemblies whereby said assemblies provide free access to said carton throat from a pair of opposite sides thereof when in operative position on said guide rods, means for effecting relative movement of said assemblies toward and away from each other to accommodate said pressure throat to the length of cartons being sealed therebetween, a carton supporting and advancing platform located in one end of said throat, means operative to reciprocate said carton supporting and advancing platform whereby a carton thereon is advanced into said pressure throat and cartons in said throat in advance thereof are urged through said throat, and an identical longitudinal section of a carton closing table fixed to a face of each of said assemblies whereby said sections are adapted to the size of a carton as said assemblies are moved toward and away from each other.

References Cited in the file of this patent
UNITED STATES PATENTS

| | | |
|---|---|---|
| 2,320,362 | Jensen | June 1, 1943 |
| 2,904,941 | Midnight | Sept. 22, 1959 |
| 2,912,806 | Bowman | Nov. 17, 1959 |
| 2,968,901 | Johnson | Jan. 24, 1961 |
| 2,997,830 | Nelson | Aug. 29, 1961 |
| 3,038,284 | Kaestner | June 12, 1962 |